(12) United States Patent
Adams et al.

(10) Patent No.: US 9,349,134 B1
(45) Date of Patent: May 24, 2016

(54) DETECTING ILLEGITIMATE NETWORK TRAFFIC

(75) Inventors: Lawrence E. Adams, Chicago, IL (US); Chris McAvoy, Chicago, IL (US)

(73) Assignee: Google Inc., Mountain View, CA (US)

( * ) Notice: Subject to any disclaimer, the term of this patent is extended or adjusted under 35 U.S.C. 154(b) by 974 days.

(21) Appl. No.: 12/131,774

(22) Filed: Jun. 2, 2008

Related U.S. Application Data (60) Provisional application No. 60/941,266, filed on May 31, 2007.

(51) Int. Cl.
*G06F 21/00* (2013.01)
*G06Q 30/02* (2012.01)
*G06F 17/30* (2006.01)

(52) U.S. Cl.
CPC ...... *G06Q 30/0248* (2013.01); *G06F 17/30861* (2013.01); *G06F 21/00* (2013.01); *G06Q 30/0222* (2013.01); *G06Q 30/0277* (2013.01)

(58) Field of Classification Search
CPC .......... G06Q 30/0248; G06Q 30/0277; G06Q 10/0635; G06Q 30/0222; G06F 17/30861; G06F 21/00
USPC ................ 726/22, 24, 26, 28, 29, 30, 32, 33; 380/59; 713/150, 152, 187, 188
See application file for complete search history.

(56) References Cited

U.S. PATENT DOCUMENTS

| | | | |
|---|---|---|---|
| 6,314,451 B1 * | 11/2001 | Landsman et al. ............ | 709/203 |
| 7,149,718 B1 | 12/2006 | Wilson | |
| 7,188,260 B1 | 3/2007 | Shaffer et al. | |
| 7,222,127 B1 | 5/2007 | Bem et al. | |
| 7,409,714 B2 | 8/2008 | Gupta et al. | |
| 7,610,216 B1 | 10/2009 | May et al. | |
| 7,657,626 B1 * | 2/2010 | Zwicky ......................... | 709/224 |
| 7,734,600 B1 | 6/2010 | Wise et al. | |
| 7,788,132 B2 | 8/2010 | Desikan et al. | |
| 8,019,700 B2 | 9/2011 | Provos et al. | |
| 8,209,748 B1 | 6/2012 | Nordstrom et al. | |
| 2002/0116320 A1 | 8/2002 | Nassiri | |
| 2002/0184363 A1 * | 12/2002 | Viavant et al. ................ | 709/224 |
| 2003/0051064 A1 * | 3/2003 | Curtis ........................... | 709/313 |
| 2004/0117460 A1 * | 6/2004 | Walsh et al. ................... | 709/219 |
| 2004/0153365 A1 * | 8/2004 | Schneider et al. ............. | 705/14 |

(Continued)

OTHER PUBLICATIONS

Casado, M. and Freedman, M.J., "Peering Through the Shroud: The Effect of Edge Opacity on IP-Based Client Identification," In Proceedings of the 4th Networked Systems Design and Implementation, Apr. 2007, 14 pages.

(Continued)

*Primary Examiner* — Carl Colin
*Assistant Examiner* — Gary Lavelle
(74) *Attorney, Agent, or Firm* — Fish & Richardson P.C.

(57) ABSTRACT

The subject matter of this specification can be embodied in, among other things, a method that includes emulating a user web browsing session including directing a web browser installed on a computer system to visit one or more websites. The method also includes logging network traffic delivered to the computer system in response to the web browser visiting the one or more websites. In addition, the method includes identifying network traffic requested by an application installed on the computer system and delivered to the web browser in response to the web browser visiting the one or more websites.

15 Claims, 6 Drawing Sheets

(56) References Cited

U.S. PATENT DOCUMENTS

| | | | |
|---|---|---|---|
| 2005/0222902 A1 | 10/2005 | Coit et al. | |
| 2005/0235030 A1* | 10/2005 | Lauckhart et al. | 709/200 |
| 2006/0101341 A1 | 5/2006 | Kelly et al. | |
| 2006/0136294 A1* | 6/2006 | Linden et al. | 705/14 |
| 2006/0149623 A1 | 7/2006 | Badros et al. | |
| 2006/0190384 A1 | 8/2006 | Gurley et al. | |
| 2006/0206438 A1 | 9/2006 | Sakaue et al. | |
| 2006/0253458 A1 | 11/2006 | Dixon et al. | |
| 2006/0265493 A1* | 11/2006 | Brindley et al. | 709/224 |
| 2007/0180090 A1 | 8/2007 | Fleischman et al. | |
| 2007/0208751 A1 | 9/2007 | Cowan et al. | |
| 2007/0219654 A1 | 9/2007 | Frink et al. | |
| 2007/0239530 A1 | 10/2007 | Datar et al. | |
| 2008/0235794 A1 | 9/2008 | Bogner | |
| 2008/0243571 A1* | 10/2008 | Edelman | 705/7 |
| 2008/0262960 A1 | 10/2008 | Malone et al. | |
| 2008/0294711 A1* | 11/2008 | Barber | 709/201 |
| 2008/0300981 A1 | 12/2008 | Crites et al. | |
| 2009/0094697 A1 | 4/2009 | Provos et al. | |
| 2010/0037100 A1* | 2/2010 | Lopian | 714/35 |
| 2010/0169187 A1 | 7/2010 | Swallow et al. | |
| 2011/0016533 A1 | 1/2011 | Zeigler et al. | |

OTHER PUBLICATIONS

Christianson, B. and Harbison, W.S., "Why Isn't Trust Transitive?" In Proceedings of the International Workshop on Security Protocols, 171-176, London, UK, 1997. Springer-Verlag.

Christodorescu, M., et al., "Malware Normalization," Technical Report 1539, University of Wisconsin, Madison, Wisconsin, USA, Nov. 2005, 1-17.

Cooke, E., et al., "The Zombie Roundup: Understanding, Detecting, and Disrupting Botnets," In Proceedings of the USENIX SRUTI Workshop, 39-44, 2005.

Dean, J. and Ghemawat, S., "MapReduce: Simplified Data Processing on Large Clusters," In Proceedings of the Sixth Symposium on Operating System Design and Implementation, 137-150, Dec. 2004.

Microsoft Security Bulletin MS060-014, Vulnerability in the Microsoft Data Access Components (MDAC) Function Could Allow Code Execution (911562), <http://www.microsoft.com/technet/security/Bulletin/>, MS06-014.mspx, May 2006,5 pages.

Moshchuk, A., et al., "A Crawler-based Study of Spyware on the Web," In Proceedings of the 2006 Network and Distributed System Security Symposium, 17-33, Feb. 2006.

Provos, N., et al., "The Ghost in the Browser Analysis of Web-based Malware," [on-line], [Retrieved on Sep. 10, 2007], Retrieved from the internet <http://www.usenix.org/events/hotbots07/tech/full_papers/provos/provos.pdf>, 9 pages.

Wang Y-M., "Automated Web Patrol with Strider HoneyMonkeys: Finding Web Sites That Exploit Browser Vulnerabilities" In Proceedings of the 2006 Network and Distributed System Security Symposium, 35-49, Feb. 2006.

* cited by examiner

DETECTING ILLEGITIMATE NETWORK TRAFFIC

CROSS-REFERENCE TO RELATED APPLICATIONS

This application claims priority from U.S. Provisional Application Ser. No. 60/941,266 filed May 31, 2007, and entitled "Method and System for Detecting Illegitimate Network Traffic," the contents of which are incorporated herein by reference.

TECHNICAL FIELD

This instant specification relates to network communications.

BACKGROUND

The advent of the Internet has provided advertisers with a new medium to promote goods and services. Compared with traditional media such as television, newspapers, radio, and magazines, the Internet provides advertisers a relatively inexpensive means to reach large groups of consumers in a targeted manner. Internet advertisements come in myriad forms: ads that appear in a separate window when a web browser visits a webpage (known as pop-up or pop-under ads); "banner" ads that direct a web browser to an advertising site when a user clicks, for example, on a image associated with the ad; or simple text links that transfer a web browser to another site when selected, to name a few.

Online merchants that do not want to incur the time and expense of placing advertisements on websites often employ affiliate networks to place their ads. Affiliate networks can recruit websites, commonly referred to as affiliates, to display advertisements for online merchants. Affiliates are often paid based on the number of users who click on or otherwise interact with a merchant's link displayed on the affiliate's page (pay-per-click) or the number of users who purchase a product from the merchant once the user selects the merchant's link (pay-per-sale).

Some affiliates use adware or spyware programs to increase the commissions they receive from affiliate network ads. An affiliate can buy an "impression," i.e., the display of an ad, from a spyware or adware provider and have an ad generated by the affiliate network displayed when a user visits a specified website. For example, an adware application surreptitiously installed on a user's computer can request that a specified pop-up ad containing the affiliate network's advertisement be transmitted to the user's computer when the user visits a selected website. If, in a pay-per-sale system, the user clicks on a link displayed in the pop-up ad and purchases a good, the affiliate receives a commission. The use of adware or spyware programs in this manner may be against the codes of conduct established by affiliate networks.

SUMMARY

In general, this document describes systems and techniques for identifying illegitimate or unwanted computer network traffic. A system can emulate user behavior to detect the source of ads delivered to a web browser by software installed on a personal computer. The system can comprise a globally distributed network of servers. Each server may run multiple virtual machines, each infected with a unique program or programs designed to deliver ads during user browsing sessions enabling the system to isolate the program responsible for serving each ad.

In a first general aspect, a computer-implemented method is described that includes emulating a user web browsing session including directing a web browser installed on a computer system to visit one or more websites. The method also includes logging network traffic delivered to the computer system in response to the web browser visiting the one or more websites. In addition, the method includes identifying network traffic requested by an application installed on the computer system and delivered to the web browser in response to the web browser visiting the one or more websites.

In a second general aspect, a system is described that includes a computer system and an emulator that emulates a user web browsing session on the computer system by directing a web browser installed on the computer system to visit one or more websites. The system also includes a traffic logger that logs network traffic delivered to the computer system in response to the web browser visiting the one or more websites. In addition, the system includes a traffic analyzer that identifies network traffic requested by an application installed on the simulated computer system and delivered to the web browser in response to the web browser visiting the one or more websites.

The systems and techniques described here may provide one or more of the following advantages. First, a system can accurately detect illegal or unwanted network traffic. Second, a system can alert a system administrator to illegal or unwanted network activity.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

This document describes systems and techniques for detecting and analyzing network traffic. A system is provided to track, record, and analyze network traffic created by various programs installed on user computers. The system may include software installed on user computers unintentionally or without user permission, such as spyware, adware, or other potentially undesirable or malicious software. The system can include a master server operable via a user interface. The master server can communicate with and provide instructions to multiple virtual machine servers (VM servers), which can be geographically and/or logically separate from one another. In some implementations, each VM server can run multiple "virtual machines," where each virtual machine can include any software that typically would be installed on an end user system.

In a specific example, each virtual machine can be a separate, independent installation of the Microsoft Windows® operating system, with various applications installed within each installation. For example, each virtual machine can include a single adware or spyware application. The virtual machines may allow installed programs to access locations on the Internet, and record the resulting network traffic. In some cases, each virtual machine may use a proxy to access the Internet, such as where logging and analysis of network traffic is to be centralized.

The system emulates user behavior to detect the source of ads delivered to a web browser by software installed on a personal computer. A globally distributed network of servers may be deployed to test software targeted for different geographical regions, or to allow for analysis of network traffic patterns based on geographic region. The servers may be coordinated to execute tests across geography and time. In some implementations, each server may run multiple virtual machines, each having a unique program or programs designed to deliver ads during user browsing sessions enabling the system to isolate the program responsible for serving each ad.

In some implementations, each virtual machine is equipped to run one or more programs that emulate user behavior on the Internet by directing a web browser to visit web sites. The virtual machines may access various sites on the Internet through use of a URL list. The sites can be targeted for keywords, advertiser, competitor, publisher, publisher competitor, or other criteria. A user emulation program may simulate activities that a user of an infected computer would perform. Thus, network traffic resulting from both legitimate user activities and illegitimate/unwanted adware activities may be monitored. In some implementations, the virtual machines may communicate through an HTTP or other proxy that logs all activity to a centralized database. A single proxy may be used, or each VM server and/or virtual machine may use a separate proxy. When separate proxies are used, each proxy may record data to a single database for centralized reporting and analysis.

By logging and analyzing the traffic generated by adware installed on the various VM servers, the system may discern between activity initiated by the user emulation program and activity initiated by the ad serving software. The virtual machine settings may be automatically modified by the VM server or by a master server to elicit behavior from the adware. For example, the system date may be modified, and/or the delay between Internet requests may be modified.

A user interface may be used by an administrator of the system to configure tests, build and upload URL lists and report on results.

The system may include an alert system to monitor the database as data is collected. When a virtual machine logs a request from an installed adware program, the system may examine the network traffic to determine whether the data matches any configured tests. In some implementations, positive matches generate alerts to the tester along with a log of the activity and a digital screen can capture of the offending activity.

The system can be used to execute ad hoc investigations, such as where a company is interested in a specific activity reported to them by an employee, customer or other interested party.

The system also may run continuous scans so that offending/unwanted behaviors can be proactively observed, preventing a case such as where this is detected by an individual that may have a grievance against the advertiser or their technology and service providers.

An automated script may allow infected servers and/or virtual machines to browse the Internet and observe whether popup ads not requested by a user emulation program are generated. Various data stored by the browsing computer may be examined to determine which advertising providers are affected. For example, the system may collect and compare various cookies stored by each browsing computer to determine the source of network requests generated by the adware.

A master server may coordinate scans run by various virtual machines, VM servers, and/or other computer systems. For example, a set of tests may be defined in the master server, which then distributes specific jobs to the virtual machines. The system may be further automated, such as where a master URL list is provided to the master server, which then creates and distributes browsing jobs to the various virtual machines. Network traffic generated by each virtual machine may be logged and analyzed to identify traffic generated by adware installed on the virtual machines. The logged traffic also may be correlated with data from publisher affiliates to identify unexpected or abnormal data. This may assist in identifying fraudulent activity, such as where a publisher uses spyware to create fraudulent traffic to affiliate advertisements and generate unearned payments.

In some implementations, each virtual machine may have a single adware program, or a small group of related adware programs, installed. Thus, the system may compare network traffic created by the various virtual machines to traffic created by each adware program, isolate patterns and requests generated by each adware program, and create a "fingerprint" for each to allow for later identification of adware-generated network requests.

In some implementations, the virtual machines may create a graphical record of activities performed by a user emulation program and/or an adware program. For example, a user emulation program may visit a specific URL by selecting the URL in a web browser. An adware program installed on the same computer or virtual machine as the emulation program may load advertisements to generate fraudulent ad visits based on the URL visited by the emulation program. The virtual machine or computer in the system may take screen captures at regular intervals, or record a continuous video of the screen a user simulated by the emulation program would see. The video record thus includes both the expected user actions and those actions performed by the adware. This graphical record can then be logged and/or presented to an administrator of the system for further analysis.

The administration interface can also allow users of the system to define jobs for specific computers, virtual machines, and/or the entire system. As previously described, large-scale jobs may be defined which are then distributed by a master server. A user also may define specific browsing scripts, such as a list of URLs and actions to perform when visiting each URL, which can further be distributed by the master server.

In some implementations the system has large scaling capabilities, since a new virtual machine or set of virtual machines can be added to the system when a new adware program is identified or discovered. Additional VM servers and/or locations also may be added to the system to provide for further load balancing and/or geographic data collection. Thus, the system may scale with any number of adware programs to be tested. The system may include a network proxy through which traffic generated by the virtual machines is routed. Thus, all network traffic generated by user emulation programs and/or adware programs may be logged in a centralized location, such as to a single database.

Each network transaction may be assigned to a job ID and/or a task ID, and associated with video capture, screen captures, and other graphical records. For example, a master server may create a variety of jobs based on a script provided by a user of the system. The jobs may be distributed to various virtual machines, with each job including one or more tasks to be performed by the virtual machines. As the tasks are performed, network traffic, user interface data, and other information generated by the tasks may be recorded and associated with the specific job and/or task.

In general, a system administrator of an affiliate network "infects" one or more virtual machines with an undesirable application such as an adware or spyware application. The virtual machines then direct web browsers to selected websites where a link associated with the affiliate network is unlikely to appear. The subsequent network traffic is recorded, and, if a link associated with the affiliate network is detected in the recorded network traffic, an alert is sent to the system administrator.

Figure 1:
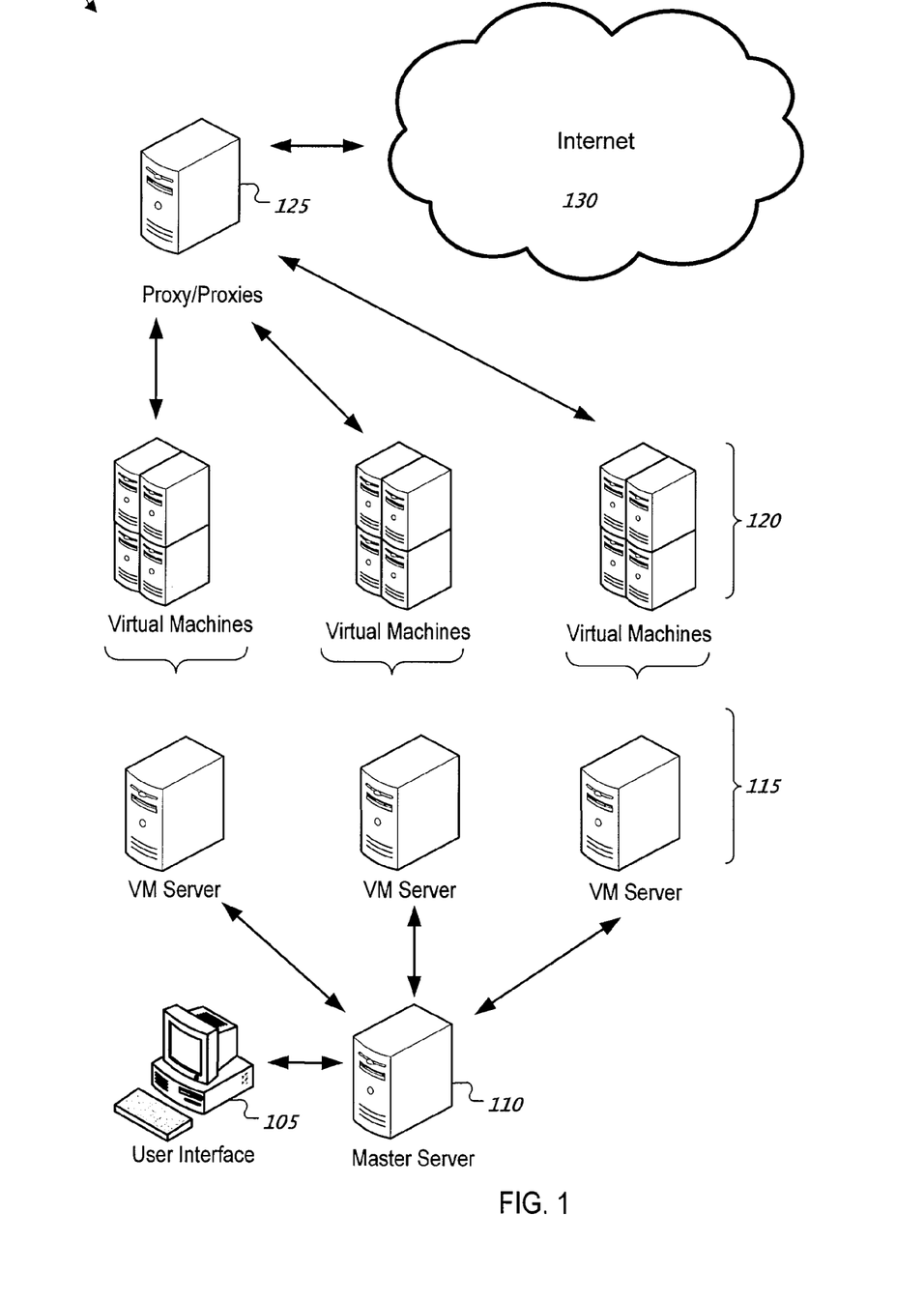
FIG. 1 illustrates an example system for analyzing network traffic created by programs installed on user computers.

FIG. 1 illustrates an example system 100 for analyzing network traffic created by programs installed on user computers. A system administrator can use a user interface 105 to build "jobs" (also referred to as "scan jobs") to run on the system 100 to detect network traffic created by programs installed on one or more virtual machines 120. A job can include a series of tasks or actions to be performed by the system 100. In some implementations, each job can include a job name, a location where the results of the job can be sent (e.g., an email or IP address), and a set of uniform resource locators (URLs). As discussed in more detail below, when the system 100 executes an exemplary job, a web browser can be directed to visit one or more URLs associated with the job, and the system 100 can track the network traffic generated in response to the web browser visiting the selected URLs.

An administrator can also create job templates using the user interface 105. A job template can comprise a default name, email address, and list of URLs. A job template can facilitate the task of creating related jobs. For example, an administrator may desire to run a series of jobs that are largely similar, but vary in one or more respects from comparable jobs, e.g., the URLs associated with each job may differ. The illustrative job template allows the administrator to create the desired jobs by modifying the desired part of the job template without changing the other data associated with the job, saving the administrator time and effort.

In addition to creating and configuring jobs, an administrator can use the user interface 105 to create scripts that can be executed by the system 100. In some implementations, a script can create jobs to run on the system 100 by altering job templates. For example, if an administrator desires to create a series of jobs with job names that have an ascending number at the end of the name (e.g., Job1, Job2, Job3, etc.), the administrator can create a script to alter a job template accordingly. A similar approach can be used to generate jobs with related URLs or that report job results to related email addresses.

In some implementations, an administrator can also use the user interface 105 to create scripts that determine how jobs are executed by the system 100. For example, as discussed further below, jobs can be executed by virtual machines 120 run on virtual machine servers ("VM servers") 115 located in different geographic regions. A system administrator can create scripts that control the distribution of jobs to VM servers 115 for subsequent execution by an associated virtual machine 120. In some circumstances, the scripts can also control when a job is executed. For example, a script can determine the day and time that a job is executed. An administrator may also create scripts that control the actions performed by a virtual machine 120 when visiting a URL, such as whether to simulate user input by selecting links found on the web page at the specified URL.

The user interface 105 can also allow an administrator to view reports created by the system 100. For example, an administrator can view reports on a graphical user interface (GUI) installed on the user interface 105. In some implementations, the user interface 105 can display video or screen captures of network activities recorded by the system 100. The recording capabilities of the system 100 are discussed in detail below.

A master server 110 can be used to control one or more VM servers 115. For example, the master server 110 can coordinate activities between VM servers 115 or upload various jobs, software applications, and instructions to a plurality of VM servers 115. In some implementations, the master server 110 can distribute one or more scripts created by an administrator that determine how a virtual machine 120 controlled by a VM server 115 will perform when visiting a URL. For an instance, a script may determine how long a virtual machine 120 stays at a particular URL or how many times a virtual machine attempts to reach a particular URL before attempting to visit another URL.

A master server can 110 also distribute jobs to VM servers 115 for subsequent execution by the virtual machines 120. As noted above, VM servers 115 can be separated from one another either geographically or logically (or, in some cases, both). For example, VM servers 115 can be physically located in different geographic regions (e.g., the United States and Canada) or can reside on two different computer networks. The master server 110 can transmit the same job or different jobs to the physically and/or logically separate VM servers 115.

In some implementations, the user interface 105 can provide a list of URLs to the master server 110, which then creates a series of jobs using the URLs specified by the list. For example, the master server 110 can create jobs by modifying a job template to incorporate the URLs provided in the URL list.

A master server 110 may also act as a repository for applications that are run by the virtual machines 120. For example, the master server may store one or more spyware or adware applications that can be installed on the virtual machines 120. The master server 110 can distribute applications to the VM servers 115 (and, in turn, the virtual machines 120) per instructions from the user interface 105.

In some implementations, the master server 110 may also act as a repository for videos and screen captures recorded by the system 100. For example, the master server 110 may store video and screen captures of a simulated user web browsing session in a database and transmit them to the user interface 105 upon request.

VM servers 115 can host one or more virtual machines 120. For example, a VM sever 115 can provide the physical hardware used to run a virtual machine 120, in addition to supplying software applications and data used by the virtual machines 120. In some implementations, a VM server 115 can modify the characteristics and behavior of a virtual machine 120. For example, a VM server 115 can modify the system date of a virtual machine 120 or the amount of time a virtual machine 120 waits before requesting data from a particular URL. In certain circumstances, a VM server 115 can control which jobs a virtual machine 120 executes and when a virtual machine 120 executes a job. The VM servers 115 can also control the amount of memory and the number of processor cycles allocated to a virtual machine. In some implementations, the functions listed above can be controlled by the master server 110.

Although FIG. 1 depicts VM servers 115 hosting virtual machines 120, a master server 110 may also host one or more virtual machines 120. In some implementations, VM servers 115 may also act master servers 110.

Virtual machines 120 can simulate a user web browsing session by directing a web browser to selected websites. A virtual machine 120 can be, for example, a simulated computer that runs run on a host computer in a manner that allows the execution of software on the simulated computer. In some implementations, virtual machines 120 can comprise user emulation software that emulates a typical user browser session. For example, the user emulation software can simulate a user web browsing session by directing a web browser to URLs associated with a job supplied by the master server 110 or VM server 115. In addition, the emulation software can adjust virtual machine 120 settings such as date, delay between website requests, etc.

In some implementations, each virtual machine 120 can have one or more applications installed on the machine. For example, each virtual machine 120 can include applications classified as adware or spyware, in addition to operating system software and other applications. In some circumstances, the adware or spyware can request the delivery of advertisements when the virtual machine 120 directs a web browser to communicate with certain websites.

In some implementations, the virtual machines 120 can communicate with websites via one or more proxies 125. In some implementations, each virtual machine transmits and receives data to and from websites through an individual proxy 125. In some instances, proxies 125 can log network traffic sent from and delivered to each virtual machine 120. For example, a proxy 125 can record data packets transmitted through the proxy 125, local and remote IP addresses, along with other network traffic data. In some instances, proxies 125 can discern between activity prompted by a user emulation program installed on a virtual machine 120 and activity generated by a spyware or adware application. For example, the proxy 125 may compare the logged network traffic with network traffic patterns associated with known adware or spyware programs to determine whether the logged traffic was generated by a user emulation program or an adware or spyware program.

Figure 2:
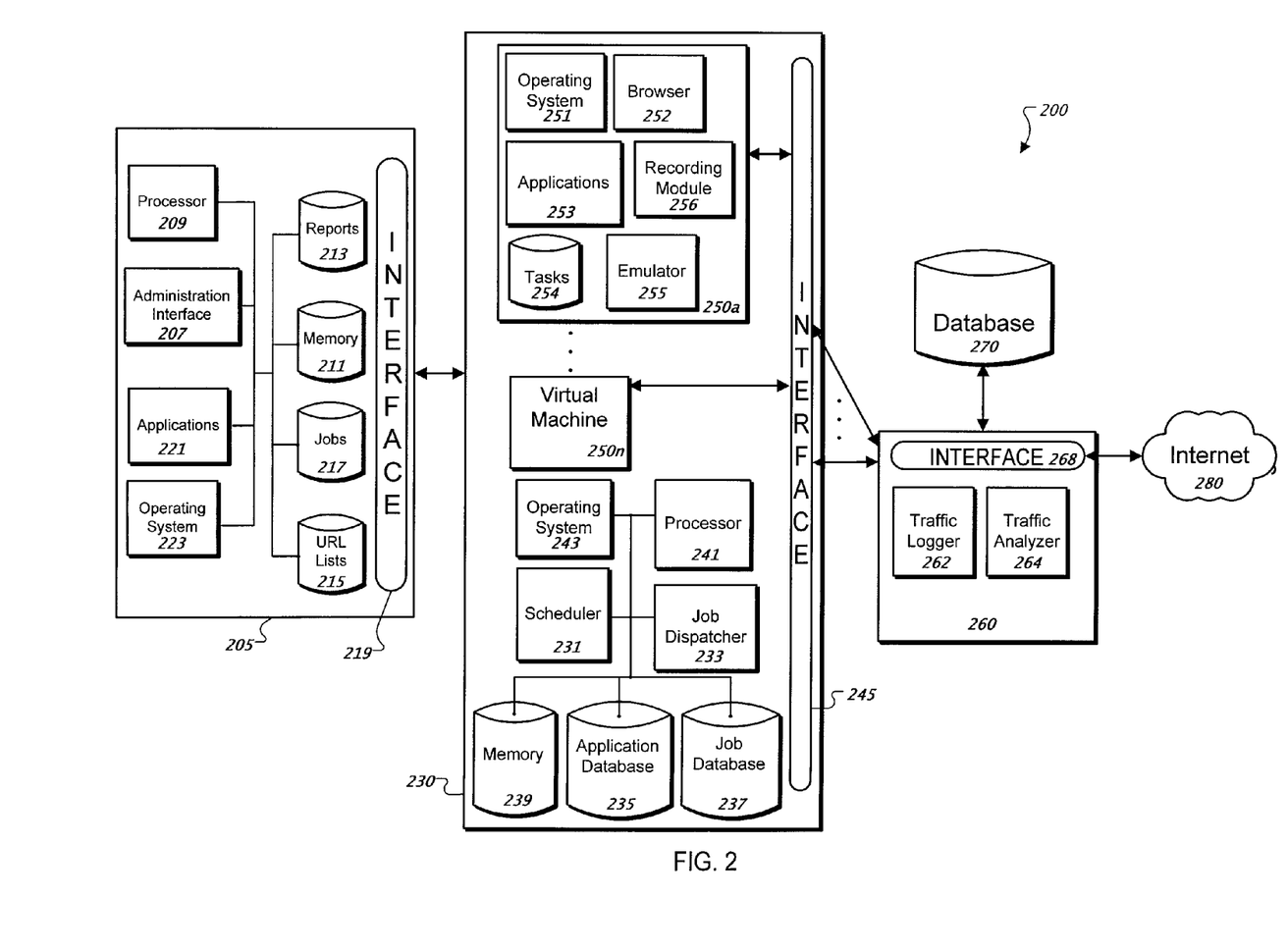
FIG. 2 illustrates a block diagram of an example system for analyzing network traffic created by programs installed on user computers.

FIG. 2 illustrates a block diagram of an example system 200 for analyzing network traffic created by programs installed on user computers. The system 200 can include a user interface 205 for controlling the system 200. In some implementations, the user interface 205 can be a computing device that includes an administration interface 207 for creating and configuring jobs, job templates, scripts, tests, etc. The administration interface 207 can be a graphical user interface that accepts user input from input devices such as keyboards and trackballs.

The user interface 205 can also include a processor 209 for executing instructions stored in memory 211. For example, memory 211 may contain instructions that when executed by the processor 209 generate and control the administration interface 207 and other applications 221. Memory 211 may also store other data related to the system such as scripts, applications to be installed on virtual machines 250a to 250n, recorded network traffic, job reports, collections of data that can be used to identify illegitimate/unwanted network traffic such as one or more affiliate links, etc. The user interface 205 can also include an operating system 223 to control user interface functions and various other applications 221.

The user interface 205 can also include data repositories. For example, the interface 205 can include a report database 213 for storing reports; a URL list database 215 for storing collections of URL lists; and a job database 217 for storing created jobs and job templates. In some implementations, the data stored in the report, URL list, and job databases may be stored in memory 211.

In some implementations, the URLs may include sites that have been targeted because the sites are associated with a particular advertiser, competitor, or publisher. For example, if an affiliate network suspects that a particular affiliate is misusing an affiliate advertisement, the URLs may include sites associated with the advertiser. Or, in some cases, the site may have been selected based on certain keywords. In an illustrative example, a site that contains the word "kayak" may be selected if the affiliate network suspects that an affiliate is using an affiliate network advertisement related to kayaks in a manner that violates the affiliate network's code of conduct.

The user interface 205 can also include an I/O interface 219. The I/O interface can communicate with other devices and systems over a communications network such as the Internet. The I/O interface can also allow the user interface 205 to communicate with peripheral devices such as keyboards and displays connected to the user interface 205.

The system 200 may also include a VM server 230. A VM server can be a computing device used to control one or more virtual machines 250. In some implementations, a VM server 230 can act as a master server that controls other VM servers 230.

The illustrative VM server 230 includes an application database 235. The application database 235 can store applications that can be executed by virtual machines 250a to 250n. For example, the application database 235 may store operating system code, in addition to spyware and adware applications that can be executed by the virtual machines 250a to 250n. In some implementations, the user interface 205 may transmit applications to the VM server 230 that can be subsequently stored in the application database 235.

Similarly, a VM server 230 can include a job database 237 that can be used to store one or more jobs received by the VM server 230 from the user interface 205. The VM server 230 can also include memory 239 to store applications used to control the VM server 230 as well scripts provided by the user interface 205. In some implementations, memory 239 can also store lists of URLs provided by the user interface 205 and data that can be used to identify illegitimate/unwanted network traffic such as one or more affiliate links.

The VM server 230 can also include a scheduler 231 that can be used to control when and how jobs assigned to virtual machines 250a to 250n are executed. For example, using instructions provided by the user interface 205, the scheduler 231 can determine the date and time that a particular job is executed, allowing the scheduler 231 to coordinate jobs between virtual machines 250a to 250n.

In some implementations, the VM server 230 can also include a job dispatcher 233. As the name implies, the job dispatcher 233 is an application (e.g., software application) that can control the delivery of jobs to one or more virtual machines 250. For example, the user interface 205 can transmit instructions to the VM server 230 that indicate which virtual machine 250a to 250n performs a specified job. In response, the job dispatcher 233 can allocate the specified job to an identified virtual machine 250a to 250n.

In some implementations, the job dispatcher 233 can also create jobs using URLs provided in memory 239 and job templates stored in the job database 237. For example, the job dispatcher 233 can modify a job template with one or more URLs stored in memory 239 to create a series of jobs.

In some implementations, the job dispatcher 233 can be a website created using the Ruby on Rails® web application framework. The website can be used to create one or more tasks that can be provided to one or more virtual machines 250.

The VM server 230 may also include a processor 241 for executing instructions stored in memory 239. For example, memory 239 can contain instructions that when executed by the processor 241 control the VM server 230.

The VM server 230 can also include one or more virtual machines 250a to 250n that can execute jobs supplied by either the VM server 230 or the user interface 205. In some implementations, virtual machines 250a to 250n can be software applications run on the VM server 230 that simulate a physical computer and execute software applications on the simulated physical computer. A virtual machine 250 can include an operating system 251 such as the Microsoft Windows® operating system to control the operation of software applications executed by the virtual machine 250. In addition, a virtual machine 250 can include a web browser 252 such as Internet Explorer®. In some implementations, a virtual machine 250 can include various applications 253 that can include one or more applications considered spyware or adware. In addition, a virtual machine 230 can also include a task repository 254 for storing tasks.

In some implementations, a virtual machine 250 can include an emulator 255. The emulator 255 can simulate a user web browsing experience by directing a web browser 252 to visit one or more web sites associated with a task stored in the task repository 254. The illustrative emulator 255 can be a Python application that uses the web browser 252 to open URLs specified by one or more tasks.

The virtual machine 250 can also include a recording module 256 for recording simulated user web browsing sessions. For example, the recording module 256 can record video of a graphical display generated by the emulator 255 during a simulated user web browsing session. In some implementations, the recording module 256 can capture screenshots of the graphical display at regular intervals.

Like the user interface 205, the VM server 230 can include an I/O interface 245 for communicating with other devices and systems, as well as peripheral devices connected to the VM server such as displays, keyboards, printers, etc.

The system 200 can also include one or more proxy servers 260. The proxy servers 260 can route network traffic to and from one or more virtual machines 250a to 250n to one or more websites through the Internet 280. A proxy server can include, for example, a traffic logger 262 that logs data packets sent and received by the proxy. The logged data packets may be stored in a database 270 for analysis.

The logged data packets can be analyzed by a traffic analyzer 264 to determine whether the network traffic was the result of a request by an application installed on a virtual machine 250 such as a spyware or adware application. For example, the traffic analyzer 264 can compare the logged network traffic with traffic patterns associated with known spyware and adware applications. In some implementations, the appearance of links associated with an affiliate network in the logged network traffic may be flagged as an indication that the network traffic was the result of a spyware or adware request. Upon detecting network activity suspected of originating from a request made by a spyware or adware application, the traffic analyzer can, for example, issue an alert or notification to the user interface 205. For example, the traffic analyzer 264 can send an email to an address specified by the user interface 205 or that is associated with the task being executed.

In an alternative implementation, the traffic analyzer 264 can scan websites to determine whether offending behaviors are occurring. For example, the traffic analyzer 264 can crawl websites and identify affiliate links. Once affiliate links are identified, the URL of the site containing the links can be reported the user interface 205 by the analyzer 264.

Figure 3:
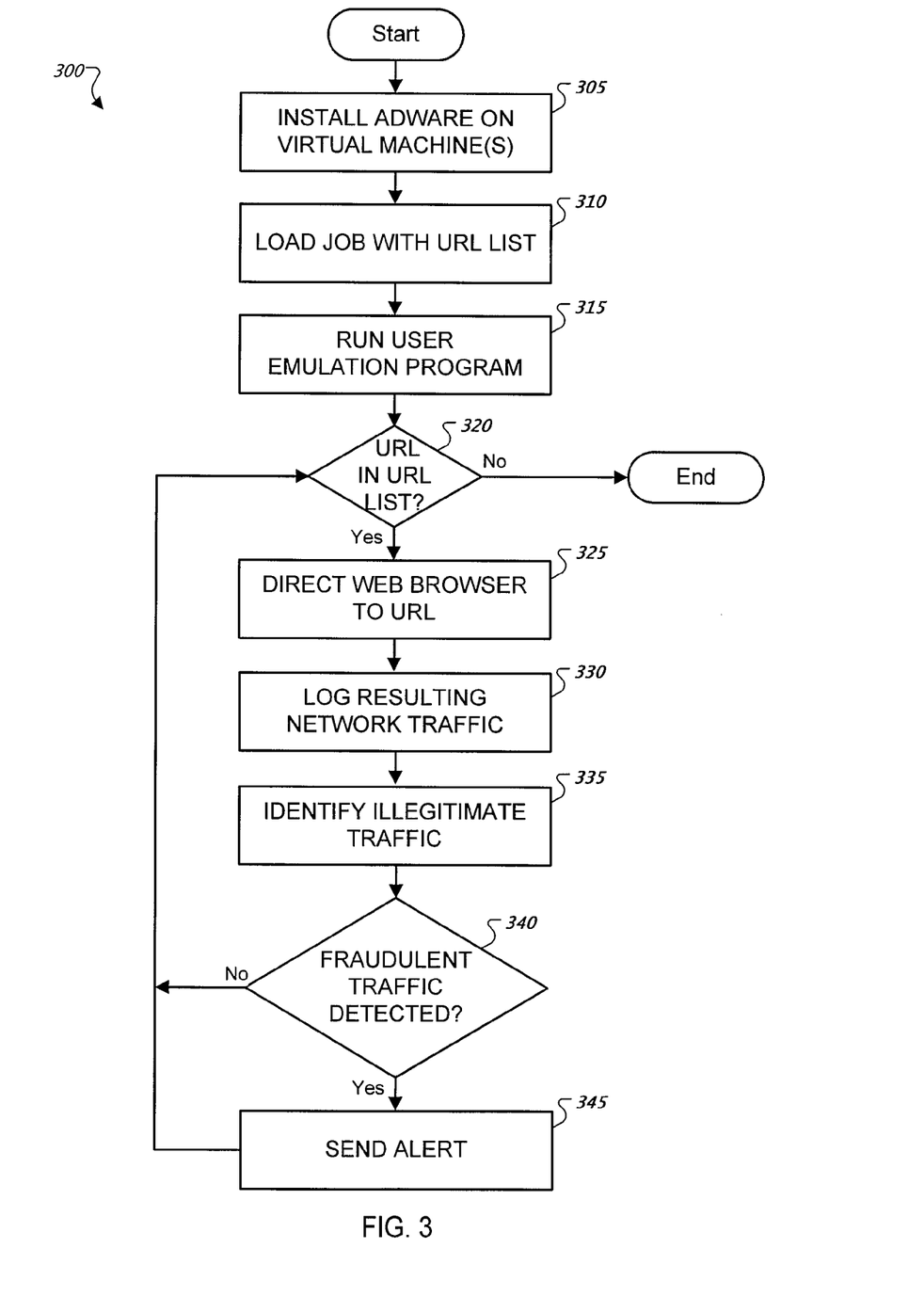
FIG. 3 is a flow chart of an example process for detecting illegitimate/unwanted network traffic.
Figure 4:
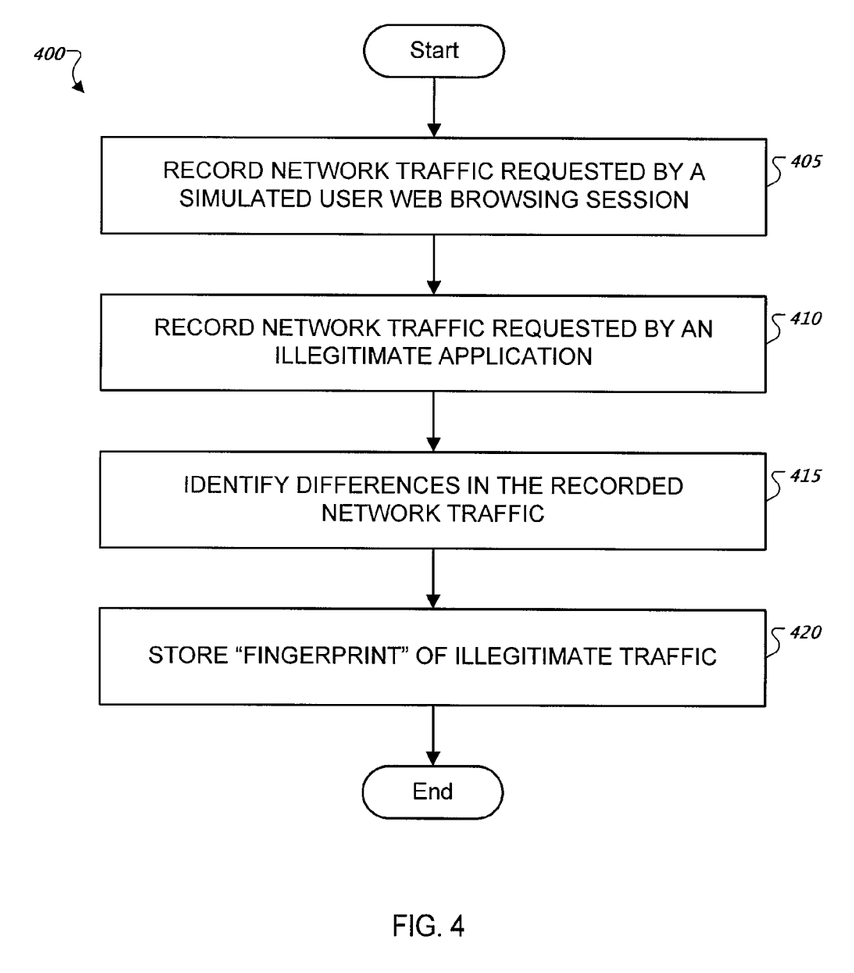
FIG. 4 is a flow chart illustrating an example method of determining patterns of illegitimate/unwanted network traffic.

FIGS. 3 and 4 are flow charts of example processes 300 and 400 for detecting illegitimate/unwanted network traffic. The processes 300 and 400 may be performed, for example, by a system such as system 200 and, for clarity of presentation, the descriptions that follow use system 200 as the basis of an example for describing the processes. However, another system, or combination of systems, may be used to perform the processes 300 and 400.

FIG. 3 is a flow chart of an example process 300 for detecting illegitimate/unwanted network traffic. The process 300 begins at step 305 where one or more adware applications are identified and installed on, for example, a virtual machine. For example, a VM server 230 can distribute adware and spyware applications to virtual machines 250a to 250n. In an illustrative example, the VM server 230 can assign different adware or spyware applications to virtual machines 250a to 250n to facilitate determining which adware or spyware applications are associated with particular types of illegitimate/unwanted network traffic.

Subsequently, a job is loaded with a URL list at step 310. For example, either the user interface 205 or the VM server 230 can associate one or more URLs to a job that is to be executed on the system 200. In some implementations, either the user interface 205 or the VM server 230 can create a job by modifying a stored job template with one or more URLs to be visited by the virtual machine 250.

After a job is loaded with a URL list at step 310, a user emulation program can be run at step 315. For example, an emulator 255 associated with a virtual machine 250 can be executed to simulate a user web browsing session. Once the user emulation program is activated at step 315, the user emulation program determines whether a URL exists in the URL list at step 320. For example, the emulator 255 can scan the URL list to see if any URLs are present. If a URL exists, a web browser 252 can be directed to the URL by the emulator 255 at step 325. For example, the emulator 255 can instruct the web browser to visit the specified URL. If not, the process ends.

At step 330, the resulting network traffic is logged. For example, the proxy 260 may store copies of data packets transmitted through the proxy 260 in a database 270. In some implementations, headers associated with the network traffic can be stored in the database 270.

At step 335, illegitimate/unwanted network traffic can be identified. For example, the logged traffic can be compared to saved traffic patterns that have been associated with activity prompted by a spyware or adware application. Next, fraudulent/unwanted traffic in the identified traffic is identified at step 340. For example, the traffic analyzer 264 can determine whether links associated with an affiliate network or other entity are present in the identified traffic by comparing the traffic to a predetermined list of affiliate links. Links in the network traffic matching links in the predetermined list can be considered fraudulent traffic. If fraudulent traffic is identified, action can be initiated (e.g., an alert can sent or a log can be updated) at step 345. For example, the proxy 260 can send an email to the user interface 205 containing information relevant to the detected traffic, e.g., the publisher associated with the link, the URL of the link, and any video recordings or screenshots captured by the virtual machine 250.

FIG. 4 is an example flow chart 400 illustrating a method of determining patterns of illegitimate/unwanted network traffic. The method begins at step 405 where network traffic generated by a simulated user web browsing session is recorded. For example, a virtual server 230 can supply a task including one or more URLs to a virtual machine 250. The virtual machine 250 can execute the task and a proxy 260 can log the resulting traffic.

Next, at step 410 network traffic requested by an illegitimate/unwanted application is recorded. For example, a VM server 230 can install an illegitimate/unwanted application such as a spyware or adware application on a virtual machine 250. The VM server 230 can also supply a task containing the same URLs used to record a simulated user web browsing session in step 405 above. The virtual machine 250 can subsequently execute the illegitimate/unwanted application and direct a web browser to the URLs specified in the task. Subsequently, a proxy 260 can log the resulting network traffic.

The method proceeds to step 415 where differences between the recorded network traffic are identified. For example, a traffic analyzer 264 can compare the network traffic recorded at steps 405 and 410. In some implementations, the traffic analyzer 264 can compare data packets transmitted to and from the virtual machine 250 during the web browsing sessions recorded at steps 405 and 410. In some circumstances, the traffic analyzer 264 can compare log headers. The differences between the first recording session at step 405 and the second recording session at step 410 can be considered the "fingerprint" of the adware application. The adware fingerprint may be stored by the proxy at step 420.

Figure 5:
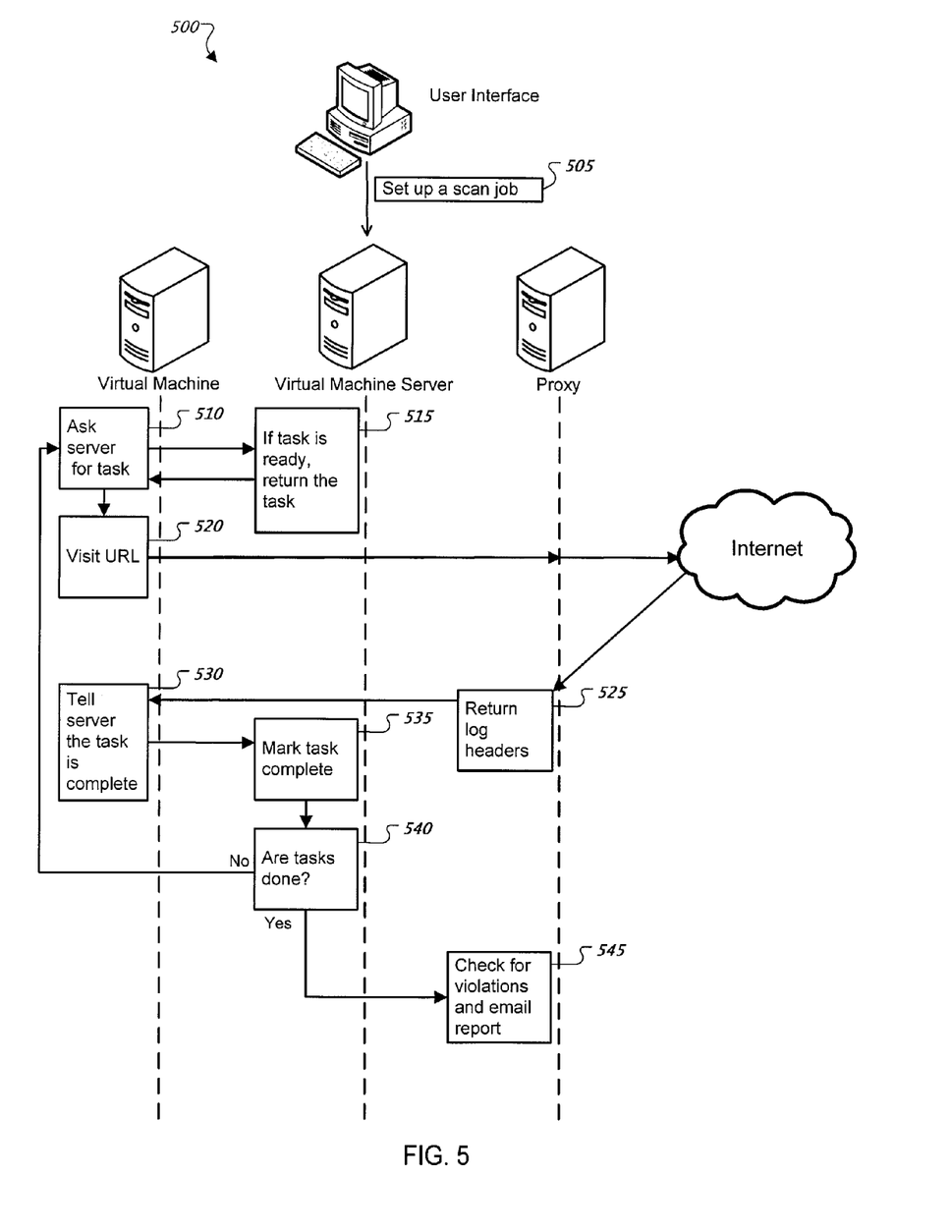
FIG. 5 illustrates an example method for analyzing network traffic created by programs installed on user computers in a client-server environment.

FIG. 5 illustrates an example method 500 for analyzing network traffic created by programs installed on user computers in a client-server environment. The method begins at step 505 where a scan job is set up. An administrator can create a scan job using, for example, a user interface 205. For example, the user can specify a job name, a location to send a report regarding the results of the scan job, and one or more URLs for a virtual machine 250 to visit. Next, at step 510, a task can be identified (e.g., a virtual machine 250 can request a task from a virtual machine server 230). For example, the virtual machine 250 can send a request to a virtual machine server 230 for one or more tasks, i.e., an action associated with a scan job. For example, a task might include one or more URLs for the virtual machine 250 to visit. If a task is ready, a task is returned by the virtual machine server at step 515.

In response to identifying a task, a URL specified by the task can be visited at step 520 (e.g., using a proxy 260). For example, the virtual machine 250 can direct a web browser 252 to the URL specified by the task, and the web browser can transmit and receive data to and from the specified URL using the proxy 260. At step 525, the log headers can be recorded. For example, when the proxy 260 transmits data to and from the virtual machine 250, the proxy can record the data transmitted and transfer log headers associated with the network traffic.

At step 530, a check can be made to determine if the task has been completed. If so, the task can be marked complete at step 535. If more tasks remain at step 540, the process can return to step 510, where the virtual machine asks for another task. If no further tasks remain, a check can be made for violations and email alerts regarding identified violations at step 545. As described above in reference to FIG. 3, a traffic analyzer 264 can compare recorded network traffic with network traffic patterns associated with adware or spyware applications. If a match is found, the proxy 260 can send an alert to the user interface 205.

Figure 6:
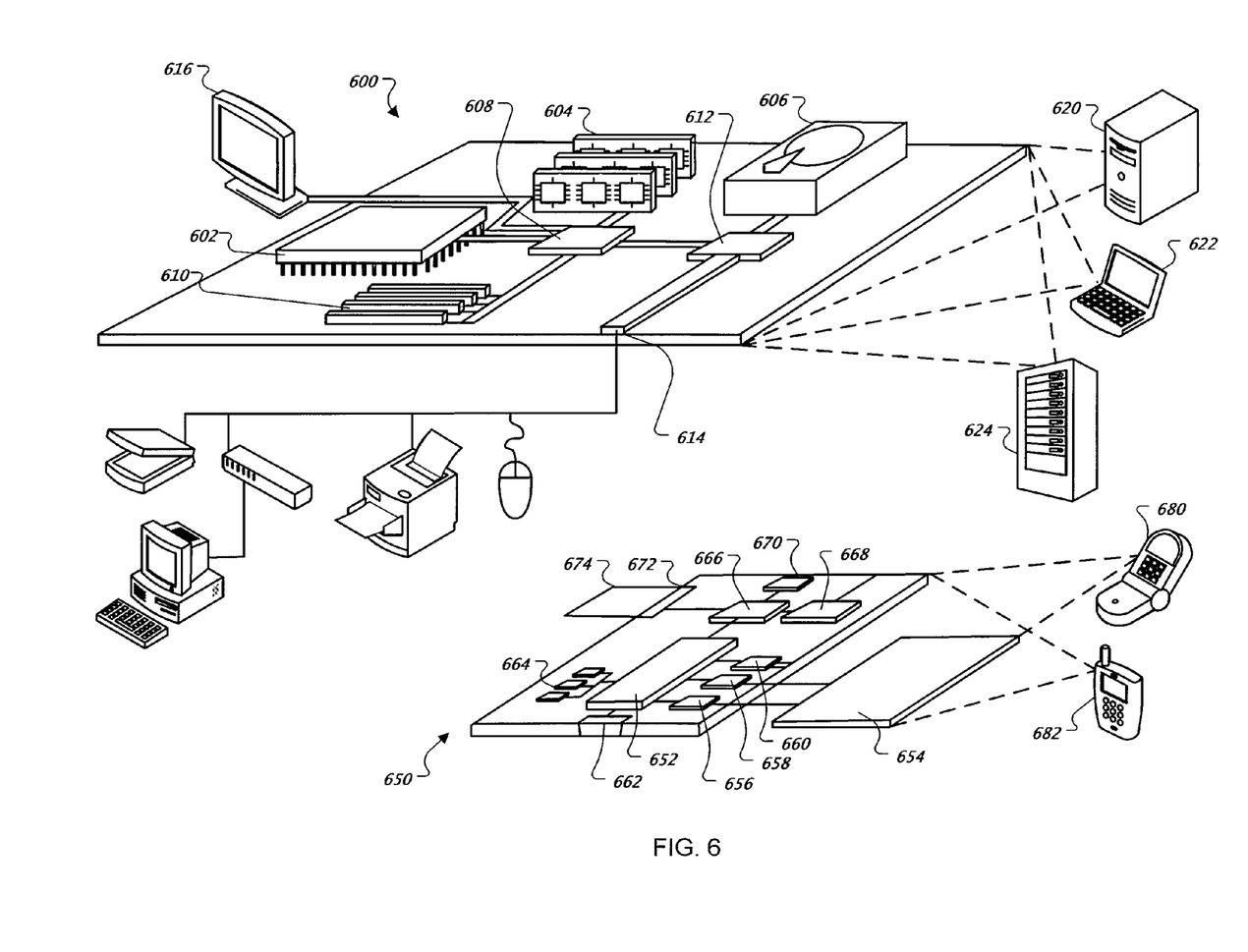
FIG. 6 shows an example of a computer device that can be used to implement the techniques described here.

FIG. 6 shows an example of a computer device 600 that can be used to implement the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various buses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, container document 102MA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ad servers ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal.

The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
   recording first network patterns generated by simulated user web browsing sessions on a computer system, the computer system comprising adware applications, and the first network traffic patterns being associated with the adware applications;
   identifying one or more tasks specifying one or more website locations to be visited by the computer system, the one or more tasks being requested by an adware application on the computer system;
   directing a web browser installed on the computer system to visit the one or more website locations, each website location being provided by a corresponding publisher;
   determining that the one or more tasks have been completed;
   recording second network traffic resulting from completing the one or more tasks;
   comparing the first network traffic patterns with the second network traffic to determine traffic associated with the adware application, and to identify which of the adware applications is associated with the determined traffic;
   generating, in response to determining the traffic associated with the adware application identified, an alert including information relevant to the determined traffic, the information comprising identities of one or more publishers associated with the one or more website locations; and
   sending the alert to a user interface.

2. The method of claim 1, further comprising communicating with the one or more website locations using one or more proxies.

3. The method of claim 1, further comprising modifying a system date of the computer system.

4. The method of claim 1, further comprising modifying a delay between website requests made by the web browser.

5. The method of claim 1, further comprising recording video or screenshots of the web browser.

6. A system comprising:
   one or more first computing devices to implement a proxy server to record first network traffic patterns generated by simulated user web browsing sessions the first network traffic patterns being associated with adware applications; and
   one or more second computing devices to implement a virtual machine to identify one or more tasks specifying one or more website locations to be visited and to determine that the one or more tasks have been completed, the one or more tasks being requested by an adware application on the virtual machine, wherein the proxy server is configured to record second network traffic resulting from completing the one or more tasks;
   the virtual machine comprising an emulator, which is executable by the one or more second computing devices, to emulate a user web browsing session by directing a web browser to visit the one or more website locations, each website location being provided by a corresponding publisher; and
   the proxy server comprising an analyzer, which is executable by the one or more first computing devices, to:
      compare the first network traffic patterns with the second network traffic to determine traffic associated with the adware application, and to identify which of the adware applications is associated with the determined traffic; and
      generate, in response to determining the traffic associated with the adware application identified, an alert including information relevant to the determined traffic, the information comprising identities of one or more publishers associated with the one or more website locations;
   wherein the proxy server is configured to send the alert to a user interface.

7. The system of claim 6, further comprising a recording module to record video or screenshots of an emulated user browsing session on the computer system.

8. The system of claim 6, further comprising a job dispatcher to distribute one or more jobs to the computer system.

9. The system of claim 6, further comprising an administration interface to provide one or more tasks that are executable.

10. A system comprising:
    one or more computing devices; and
    one or more memory devices storing instructions that, when executed by one or more processing devices, cause the one or more processing devices to perform operations comprising:
       recording first network traffic patterns generated by simulated user web browsing sessions on the one or more computing devices, the one or more computing devices comprising adware applications, and the first network traffic patterns being associated with the adware applications;

identifying one or more tasks specifying one or more website locations to be visited by the one or more computing devices, the one or more tasks being requested by an adware application on the one or more computing devices;

directing a web browser installed on the one or more computing devices to visit the one or more website locations, each website location being provided by a corresponding publisher;

determining that the one or more tasks have been completed;

recording second network traffic resulting from completing the one or more tasks;

comparing the first network traffic patterns with the second network traffic to determine traffic associated with the adware application, and to identify which of the adware applications is associated with the determined traffic;

generating, in response to determining the traffic associated with the adware application identified, an alert including information relevant to the determined traffic, the information comprising identities of one or more publishers associated with the one or more website locations;

and sending the alert to a user interface.

11. The system of claim 10, wherein the one or more computing devices communicates with the one or more website locations by one or more proxies.

12. The system of claim 10, further comprising modifying a system date of the one or more computing devices.

13. The system of claim 10, further comprising modifying a delay between website requests made by the web browser.

14. The system of claim 10, wherein the one or more memory devices further comprise instructions that, when executed by the one or more processing devices, cause the one or more processing devices to perform operations comprising recording network traffic including means for recording video or screenshots of the web browser.

15. The system of claim 10, wherein an application comprising spyware is installed on the one or more computing devices.

* * * * *